(12) United States Patent
Igelsias et al.

(10) Patent No.: US 7,865,597 B2
(45) Date of Patent: Jan. 4, 2011

(54) METHOD FOR SMART DEVICE NETWORK APPLICATION INFRASTRUCTURE (SDNA)

(75) Inventors: Lino Igelsias, Caracas (VE); Roger Pinate, Caracas (VE); Antonio Mugica, Boca Raton, FL (US); Paul Babic, Caracas (VE); Jeffrey Naveda, Edo Miranda (VE); Dany Farina, Caracas (VE); Rodrigo Meneses, Caracas (VE); Salvador Ponticelli, Caracas (VE); Gisela Goncalves, Caracas (VE); Yrem Caruso, Caracas (VE)

(73) Assignee: Smartmatics International, Corp., St. Michael ( * ) Notice: Subject to any disclaimer, the term of this patent is extended or adjusted under 35 U.S.C. 154(b) by 0 days.

(21) Appl. No.: 11/563,139

(22) Filed: Nov. 24, 2006

(65) Prior Publication Data

US 2007/0086476 A1    Apr. 19, 2007

Related U.S. Application Data

(63) Continuation of application No. 09/682,103, filed on Jul. 20, 2001, now abandoned.

(51) Int. Cl.
*G06F 15/173* (2006.01)

(52) U.S. Cl. .................. 709/226; 709/224; 709/225

(58) Field of Classification Search .................. 709/203, 709/223, 224, 226, 229, 244, 225
See application file for complete search history.

(56) References Cited

U.S. PATENT DOCUMENTS

| | | | | |
|---|---|---|---|---|
| 6,173,322 B1 * | 1/2001 | Hu | ............................ | 709/224 |
| 6,192,403 B1 * | 2/2001 | Jong et al. | .................. | 709/224 |
| 6,192,406 B1 * | 2/2001 | Ma et al. | .................... | 709/226 |
| 6,205,480 B1 * | 3/2001 | Broadhurst et al. | ......... | 709/225 |
| 6,212,649 B1 * | 4/2001 | Yalowitz et al. | ............... | 714/31 |
| 6,247,056 B1 * | 6/2001 | Chou et al. | .................. | 709/229 |
| 6,311,219 B1 * | 10/2001 | Factor | ......................... | 709/229 |
| 6,332,163 B1 * | 12/2001 | Bowman-Amuah | ......... | 709/231 |
| 6,338,088 B1 * | 1/2002 | Waters et al. | ............... | 709/226 |
| 6,343,320 B1 * | 1/2002 | Fairchild et al. | ............ | 709/224 |
| 6,385,639 B1 * | 5/2002 | Togawa | ...................... | 709/200 |
| 6,490,617 B1 * | 12/2002 | Hemphill et al. | ............ | 709/223 |
| 6,502,131 B1 * | 12/2002 | Vaid et al. | .................... | 709/224 |
| 6,574,663 B1 * | 6/2003 | Bakshi et al. | ............... | 709/223 |
| 6,606,744 B1 * | 8/2003 | Mikurak | ...................... | 717/174 |
| 6,704,874 B1 * | 3/2004 | Porras et al. | ................... | 726/22 |
| 6,728,751 B1 * | 4/2004 | Cato et al. | ................... | 709/202 |
| 6,754,831 B2 * | 6/2004 | Brownell | ...................... | 726/15 |
| 6,757,543 B2 * | 6/2004 | Moran et al. | ............. | 455/456.1 |
| 6,757,725 B1 * | 6/2004 | Frantz et al. | ................. | 709/223 |
| 6,779,117 B1 * | 8/2004 | Wells | ........................... | 726/24 |
| 6,782,421 B1 * | 8/2004 | Soles et al. | .................. | 709/223 |
| 6,788,649 B1 * | 9/2004 | Dugan et al. | ................. | 370/254 |
| 6,792,459 B2 * | 9/2004 | Elnozahy et al. | ............ | 709/224 |
| 6,954,220 B1 * | 10/2005 | Bowman-Amuah | ......... | 715/741 |

(Continued)

*Primary Examiner*—Larry Donaghue
(74) *Attorney, Agent, or Firm*—Furr Law Firm; Jeffrey Furr, Esq.

(57) ABSTRACT

The present invention discloses a novel method to implement a Smart Device Network Application Infrastructure (SDNA) that supports and facilitates the development, deployment and management of device networks and device network applications. The Smart Device Network Application infrastructure (SDNA) refers to an integrated processing platform that supports and facilitates the development, deployment and management of distributed applications based on device networks. It involves the concurrent execution of several processes that interact to provide support and resources for said applications.

2 Claims, 7 Drawing Sheets

U.S. PATENT DOCUMENTS 7,028,228 B1 * 4/2006 Lovy et al. .................... 714/57
7,404,187 B2 * 7/2008 Baird et al. ................. 719/313
7,415,617 B2 * 8/2008 Ginter et al. ................. 713/189
2008/0216052 A1 * 9/2008 Hejlsberg et al. ........... 717/114

* cited by examiner

Condensed View of Architecture

Details of Management Services

Details of Application Services

Details of Database Services

Details of Smart Network Services

Detailed View of Architecture

Overview of Operation

METHOD FOR SMART DEVICE NETWORK APPLICATION INFRASTRUCTURE (SDNA)

BACKGROUND RELATED APPLICATIONS

This application is a Continuation of U.S. patent application Ser. No. 09/682,103 that was filed on Jul. 20, 2001. The present invention uses the concepts of True Distributed Control, Global Addressing and Protocol Morphing of our co-pending U.S. patent applications. Also, the term "device group" refers to the term "device tissue or organ" as used in our co-pending Single-Cell Control U.S. patent application.

BACKGROUND OF INVENTION

1. Background Field of Invention

This invention relates to device network applications, specifically to an infrastructure platform that supports development, deployment and management of network applications based on smart devices.

2. Background Discussion of Prior Art

The Cambridge Dictionary of American English defines a "device" to be an object or machine invented to fulfill a particular purpose. In technical literature, several types and definitions of devices are mentioned. The following are our definitions as used in the present disclosure.

In the present disclosure, the term "device" specifically refers to a unit comprising a combination of software and/or hardware that possesses configurable attributes and parameters that may uniquely identify and distinguish it from other units. The set of configurable attributes and parameters includes a program or application, which describes the operation of the device under all functional circumstances.

Depending on the application, a device may be as simple as a controller that opens an electric door when someone approaches it, or as complex as a composite controller that executes sensitive measurements within a petrochemical industrial process.

There are several types of devices, depending on their characteristics and operation:

Dumb device: refers to devices that lack intrinsic intelligence and cannot communicate with other devices. Dumb devices include conventional household appliances, electric lights, among others.

Intelligent Device: refers to devices that possess inherent intelligence, i.e., devices that have some processing power and are capable of performing logic functions. Typical intelligent devices include programmable microwave ovens, ABS brakes and traffic lights, among others.

Communication-enabled device: refers to devices capable of transmitting information over a simple communication medium, such as a serial port. Communication-enabled devices include controllers in master/slave control architectures, Ademco IR detectors, etc.

Network-enabled device: refers to devices fully capable of communicating with other devices across a network, such as personal computers. These are also called network-ready devices.

Smart device: refers to a device that is at once intelligent and network-enabled.

Beyond defining a device, other definitions are relevant to this disclosure, including those of device networks and device network applications.

The term "device network" refers to a collection of devices interconnected in a networking fashion in which they can communicate with one another to share information and resources. A device network is the underlying physical structure that supports a device network application, and its complexity, in general, depends on the complexity of the implemented application. A device network, if appropriately designed as per the present invention, can support execution of multiple concurrent applications, or execution of multiple instances of the same application. The term "device network" differs from the term "device group". The term "device group" refers to the method of uniting several devices into a logical group called device "tissue" or "organ", as described in the method of single-cell control.

The term "device network application" refers to a balanced combination of a software application and an underlying device network infrastructure. In a device network application, a software application makes use of a physical device network to accomplish an overall task. Some applications may involve interaction with an end-user, while some may not involve human interaction at all.

A home automation system illustrates a simple example of a device network application. It comprises a set of devices interconnected to form a device network (e.g., electric doors, electric lights, motion detectors, air conditioners, temperature sensors, garage door opener, cloth washer and drier, microwave oven, and others). A home automation application controls all these devices to perform according to a set plan. For instance, a siren is activated when an alarmed electric door is opened, electric lights are automatically switched on when you walk into a room, or the garage door opens automatically as your car approaches it.

A home automation system involves interaction with a user (i.e., end-user), who can perform device activations (e.g., turn lights on/off) or can perform system configuration.

In recent years, there have been many efforts invested to develop smart device technology. The results, however, have been limited to many specific technologies that produce intelligent devices and network-ready devices (specially Internet-ready). Yet, no efforts have been put towards creating a universal infrastructure that can at once support and facilitate development, deployment and management of smart device networks and smart device network applications.

Consequently, the present invention stands alone in its field as it fills an important void left by all other previous smart device-related inventions.

SUMMARY OF INVENTION

The present invention discloses a novel method to implement a Smart Device Network Application Infrastructure (SDNA) that supports and facilitates the development, deployment and management of device networks and device network applications.

Objects and Advantages

Accordingly, several objects and advantages of the present invention are:

a) To provide a comprehensive method for an integrated infrastructure that encloses all fundamental tools and environments for the development, deployment and management of device network applications;

b) To provide said method for an infrastructure in which device network applications may employ any combination of dumb, communications-enabled, intelligent, network-ready and smart devices;

c) To provide said method for an infrastructure that includes device network application development tools and environments sufficient for the implementation of all solutions leading to rapid and effective design and construction of full device network applications;

d) To provide said method for an infrastructure that includes device network application deployment tools and environments sufficient for the implementation of all solutions leading to efficient and effortless deployment of full device network applications;

e) To provide said method for an infrastructure that includes device network application management tools and environments sufficient for the implementation of all solutions leading to competent and resourceful management of full device network applications;

f) To provide said method for an infrastructure in which all tools and environments for development, deployment and management of device network applications can be universally and fully utilized in relation to all device network applications and in which no special application-specific tools and environments (other than those provided within the infrastructure) may be required;

g) To provide said method for an infrastructure that is independent of the networking technology used in building the underlying device network;

h) To provide said method for an infrastructure that is independent of the technology used to build the underlying devices that form the device network, whether smart, dumb or other;

i) To provide said method for an infrastructure which is applicable to numerous device network application embodiments and whose preferred embodiment relates to the development, deployment and management of automation-related smart device network applications, such as home automation, industrial automation, transportation automation, among many others.

Other objects and advantages of this invention will become apparent from a consideration of the ensuing description and drawings.

DETAILED DESCRIPTION

The method herein disclosed will now be described by referring to the accompanying drawings that illustrate preferred embodiment of the invention.

The Smart Device Network Application infrastructure (SDNA) refers to an integrated processing platform that supports and facilitates the development, deployment and management of distributed applications based on device networks. It involves the concurrent execution of several processes that interact to provide support and resources for said applications, SDNA is an integrated infrastructure because it incorporates into a single platform the complete lifecycle of device network applications, from inception and design, to construction and deployment, and finally to management, including application upgrade.

SDNA may operate over other basic technologies. Yet, its operation is not coupled to any specific (e.g., proprietary) technology. For instance, a device network is a fundamental requirement for the operation of SDNA, as SDNA device network applications operate on devices and device networks. However, SDNA does not require that a specific networking technology be used. SDNA is capable of interacting with the underlying device network, regardless of the network type, medium or protocol used.

Thus, SDNA is said to be independent of the underlying networking technology. In addition, a database engine is a fundamental requirement for the operation of SDNA, as SDNA internal operation and SDNA applications make use of a database engine to store essential operation, configuration and other data. However, SDNA does not require that a specific database technology be used. SDNA is capable of interacting with the underlying database engine, regardless of type, brand or other intrinsic aspects of the database. Thus, SDNA is said to be independent of the underlying database technology.

Figure 1:
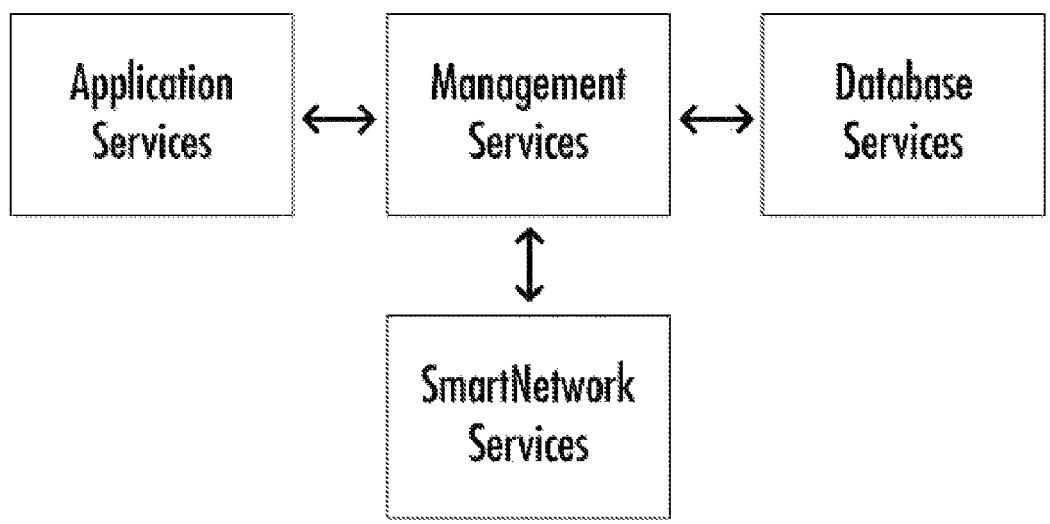
FIG. 1 shows a condensed view of the present invention's architecture containing only its fundamental modules.

FIG. 1 illustrates a condensed view of the SDNA architecture, showing its main processing modules, namely, Application Services (AS), Management Services (MS), Database Services (DBS) and Smart Network Services (SNS). In brief terms, the Application Services are the processes in charge of the creation of applications, the communications between different concurrent applications and deployment of applications. The Management Services implement general infrastructure management, including coordination and transactional management, resource and application management. The Database Services implement efficient data storage, access and manipulation functionality. The Smart Network Services implement SDNA'S networking capabilities, including all inter-device communication and messaging functionality, among others functions.

Each of these processing modules is explained in detail next.

Figure 2A:
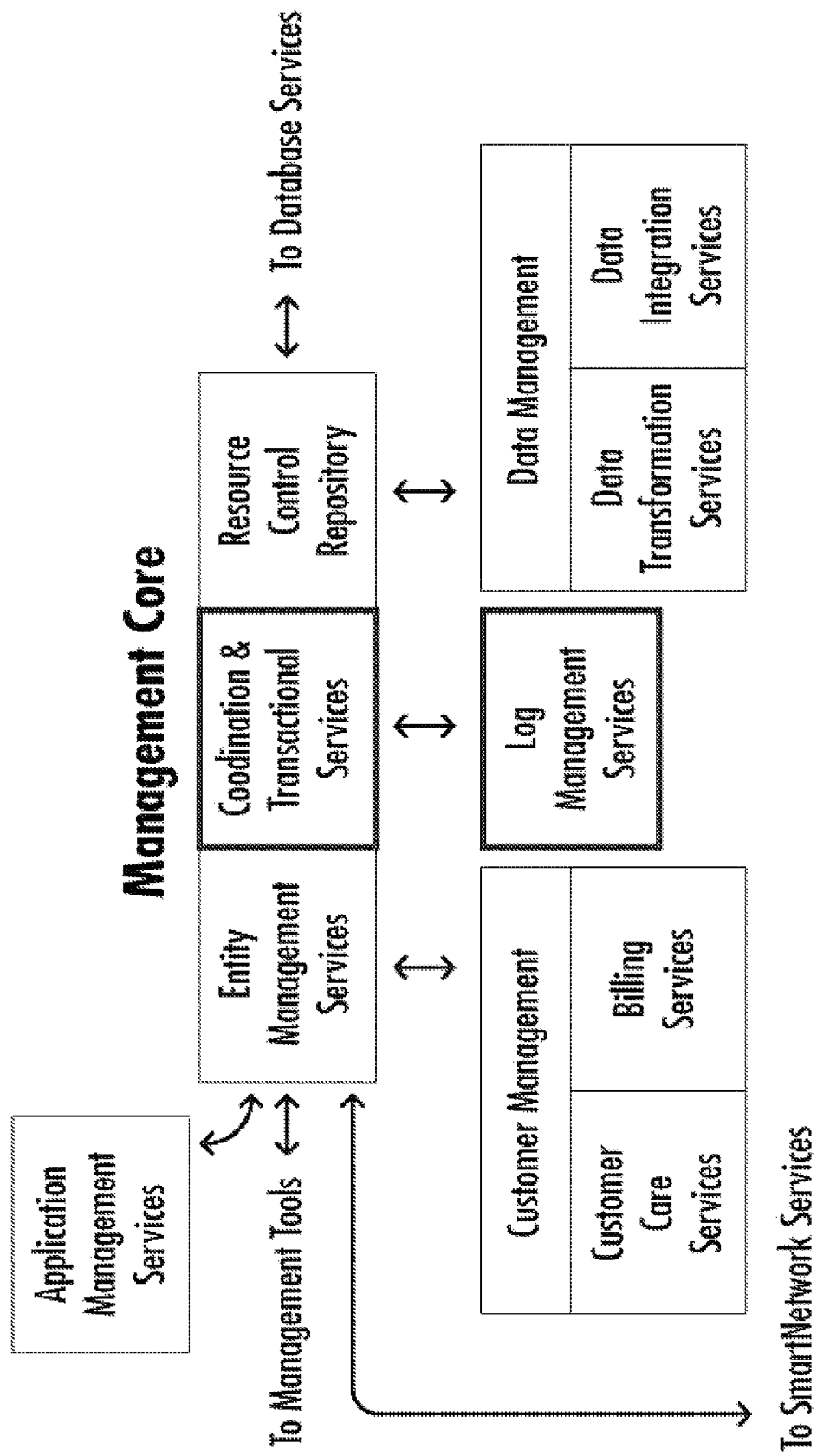
FIG. 2A illustrates details of the Management Services module.

SDNA Management Services: Management Services implements SDNA'S core functionality. It is here that overall platform management is performed, including device network and application management. It also serves as an intelligent bridge between all other SDNA Services modules. It comprises the following components, as shown in FIG. 2A:

Coordination and Transactional Services
Entity Management Services
Resource Control Repository
Application Management Services
Logging Management Services
Data Management Services
Customer Management Services Each of these is described in detailed next.

Coordination and Transactional Services: Coordination and Transactional Services (CTS) form the intelligent brain of SDNA. Its functions include operation as arbiter in the interaction of any two or more SDNA components, such as the interface between the Database Services and the Smart Network Services, etc.

In addition, CTS implement and support SDNA transactions. An SDNA transaction refers to a coherent set of operations carried out within the SDNA infrastructure. Said set of operations is performed as an undividable unit. The performing of an SDNA transaction is considered successful if and only if all operations involved in the transaction are carried out successfully. A detailed registry of all successful SDNA transactions and associated operations is stored so that they may be reverted if necessary (i.e., if one operation fails, all other transaction operations already carried out can be reverted). Additional CTS functions include synchronization between concurrent SDNA processes. Processes include any SDNA management service, applications, development tools, or other. Finally, CTS handles SDNA events, such as device network events, application events, user events, database events, and others.

SDNA Entity Management Services: An SDNA Entity refers to a logical abstraction that exists within the SDNA environment, having uniquely identifying attributes, serving a specific purpose and being capable of interacting with other similar abstractions. An SDNA entity may refer to a physical device, such as dumb and smart devices, or a virtual device, such as a user. Within SDNA, for instance, every user or physical device may be treated as an entity having configurable properties. The SDNA entity corresponding to a user may include properties such as name and address. The SDNA entity corresponding to a physical device may include properties such as device operation states (e.g., ON, OFF, Standby), parameters, etc.

Every SDNA entity exposes an interface of inputs and outputs through which it can communicate with everything outside of itself (e.g., other SDNA entities). Its set of inputs and outputs is called SDNA Entity Interface. Using an entity's interface inputs, its properties may be reviewed and/or modified. An SDNA Entity may have more than one interface.

Further, coherent relationships between SDNA entities can be defined by specifying how two or more SDNA entities can connect to each other. By wisely defining relationships between basic SDNA entities, composite SDNA entities may be created. For instance, if an entity X's outputs are connected to another entity Y's inputs, the combination of entities X and Y may behave as a unitary entity having entity X's inputs as inputs and entity Y's outputs as outputs.

An exemplary composite SDNA entity is a "smart door". A smart door consists of the logical union of several basic physical devices, e.g., an infrared motion detector, an electric door and an electric lock, which themselves are basic SDNA entities. A smart door may thus be treated as a single device that, when approached, opens itself automatically.

The advantage of performing management on a basis of SDNA entities is that management of all objects within the SDNA infrastructure may be carried out as a single process, significantly simplifying system maintenance. SDNA Entity Manager controls all aspects of SDNA entities, including user management, device and device group management and resource ownership management.

In applications that involve end-users (e.g., home owners in a home automation application), user management involves end-user activation and deactivation, and application customization. End-user activation and deactivation employs user-related data that permits enabling and disabling of an application. This process may operate automatically for some applications and semi-automatically for applications requiring user interaction.

Device and device group management includes enabling and disabling of all devices in SDNA'S device networks. In addition, new devices can be detected as they are introduced into the device network, and may be registered and configured accordingly without need of human interaction.

Device and device group management implements a robust structure of support that is used in case of device failure or when system maintenance is necessary. All devices contained in SDNA'S underlying device network are interconnected into the same physical network. At a higher level, however, devices may be grouped into logical networks to which only end-users with specific control privileges may have access. Control privileges are entity properties assigned to users that allow them to perform specific application operations or access specific SDNA resources.

Each end-user of every SDNA application can control, locally or remotely, any device present on his or her own logical network, and cannot control or monitor logical networks that belong to other end-users. The privilege scheme is strictly enforced and verified at device level.

Resource Control Repository: SDNA comprises a Resource Control Repository (RCR). The RCR contains detailed information about every resource in the SDNA infrastructure, including whether it is being used, how it is being used and what process or application is using it, among others. The Coordination and Transactional Services, the Application Management Services and other parts of SDNA Management Services use this information records to handle distribution and allocation of resources to applications and other processes that may need them.

SDNA Application Management Services: SDNA Application Management Services (AMS) support the concurrent execution of multiple applications over one single device network through SDNA Application Manager. SDNA AMS controls application activation and deactivation, and handles all application upgrades and new end-user applications created by third parties or other. In addition, AMS (in conjunction with the RCR above) controls what system resources are made available to each application.

All embedded applications residing at operative devices on the device network can be modified dynamically while they are online. This allows applications to be directly downloaded into specific network devices from SDNA'S application console across the device network. No device or network downtime is required.

Data Management Services: SDNA Data Management Services (DMS) comprise two components, namely, data transformation services and data integration services. These two parts implement the module in charge of handling data preprocessing for back-office functions and domain-specific application software. Its functions include integration with other systems. SDNA'S data, originating from network event logging or other sources, can be translated into data structures used by other systems and subsequently exported. Similarly, SDNA can import and translate data originating in foreign data systems into SDNA'S internal data structures.

Through its data transformation and integration services, SDNA also offers support for any type of devices. Data originating in foreign devices can be translated into SDNA-readable data structures. SDNA'S data structures can be translated into foreign device-readable data structures and fed to the corresponding foreign devices.

Finally, SDNA offers several supported modes for construction of interfaces to interact with end-users, such as HTTP, WAP, XML and others.

Log Services Management: The occurrence of a single transaction or event in any SDNA layer, including device network events and others, triggers the generation of an associated record indicating the nature of the transaction or event, the application associated with the transaction and the devices and users involved in the transaction. This includes both successful and unsuccessful transactions.

SDNA implements a semantic data filter generator that permits the creation of a comprehensive collection of data filters. All data logged and stored in the Smartmatic Database may be intelligently filtered to produce reports or create interfaces with other enterprise systems, such as ERPs, statistical software and others. After establishing data semantics, the physical format may be selected and an output produced.

Customer Management Services: SDNA implements complete services that specifically operate as interfaces between SDNA'S internal data structures and a service provider's existing customer care and billing systems. SDNA may be configured to automatically detect specific relevant transactions (e.g., related to resource usage, etc), register a complete record including the associated transaction data, and preprocess such data to produce information ready for input to customer care, billing and invoicing systems.

Figure 2B:
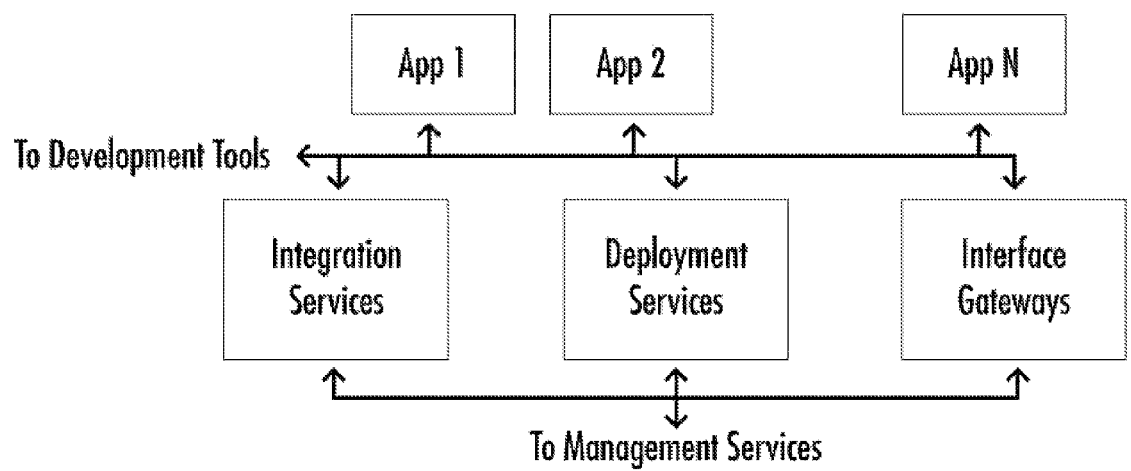
FIG. 2B illustrates details of the Application Services module.

SDNA Application Services: Shown in FIG. 2B, SDNA Application Services comprise the main support for SDNA applications and the entry point of applications into SDNA.

There are three fundamental components, namely, Integration Services, Deployment Services and Interface Gateways.

Deployment Services: Deployment Services (DS) provide tools for remote installation, deinstallation, configuration, deployment and updating (both corrective updating and version updating) of an SDNA application. DS also verifies that an application that is to be deployed is concordant with the SDNA infrastructure guidelines. Deployment Services are used by SDNA Entity Management Services to configure the application to be deployed. Each application to be deployed must be packaged in a specific manner so that Deployment Services can obtain specific deployment parameters. Deployment parameters include start deployment time, end deployment time, deployment mode, among others. Application packaging also includes a detailed description of all SDNA entities used and made available by the application.

The Deployment Manager coordinates that all underlying network devices required for the use of the application are operative and ready. Deployment Services allow deployment, updating or upgrading of an application while a device is online, thus, requiring no device or device network downtime.

Integration Services: Integration Services are processes that construct, monitor and provide tools for the configuration of communication channels among SDNA applications. These processes handle inter-application messaging, information transfer, resource sharing, and high-level application interrupts, signals and semaphores. Said channels may be shared buffers, pipes or other, and enable both synchronous and asynchronous communications. Interaction among SDNA applications and non-SDNA applications is also supported.

Gateway Interface Services: Gateway Interface Services provide support for applications' presentation layers, such as applications that involve interaction with end-users. Gateway Interfaces operate in two modes, namely, server mode and translation mode. Under the server mode, SDNA listens to user-client requests, which may be done in a specific server-client protocol (such as HTTP), processes the requests, and generates replies based on the same protocol. Under the translation mode, user requests are translated into SDNA-specific rules, and then processed. Replies are accordingly translated back from SDNA-specific language into the client-specific protocol. In addition, applications may encapsulate SDNA-specific requests inside conventional protocols. SDNA registers requests, extracts SDNA-specific instructions, processes them, and encapsulates an SDNA reply into a protocol-specific reply.

Figure 2C:
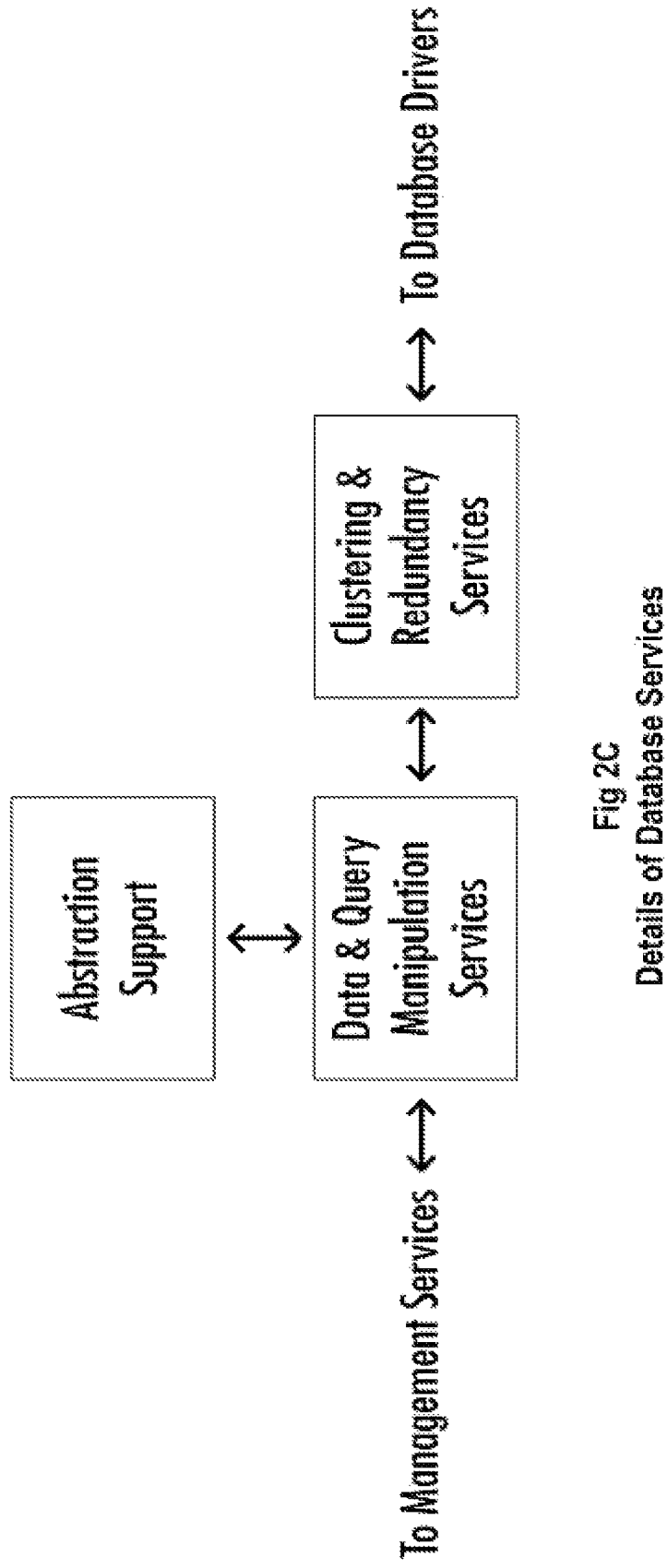
FIG. 2C illustrates details of the Smart Network Services module.

SDNA Smart Network Services: Shown on FIG. 2C, SDNA Smart Network Services implement SDNA'S networking capabilities, including all inter-device communication and messaging functionality. The Smart Network Services implement basic network services, and the Global Addressing and Protocol Morphing methods, which support secure and reliable communications across hybrid networks of incompatible network protocols and/or media.

Basic Network Services: Basic Network Services implement the fundamental communication processes of SDNA, including one-to-one messaging among devices, including acknowledged and unacknowledged message delivery, and one-to-many device messaging, including multicast and broadcasts. All network services required that are not supported by the underlying network technology are emulated using the Protocol Morphing technology (see below).

Global Addressing: Global Addressing constitutes a method of source routing that implements device-to-device communications across hybrid device networks. The method is based in packet communications in which packets are structured so that they can be readily converted between communications protocols, and in which packets enclose routing information and parameters.

Protocol Morphing: Protocol Morphing represents the lowest level of SDNA'S network services. If the underlying network technology does not support all network services that are required for SDNA'S global addressing and all other network functionalities, protocol morphing can implement them. That is, protocol morphing constitutes a method of emulation of basic network services, such as point-to-point messaging, multicast and broadcast messaging, and both acknowledged and unacknowledged packet delivery. These services are emulated only if they are not supported by the underlying network technology.

Device Functionality Emulation Services: In some applications, it may be desirable to add dumb or otherwise limited devices that are not already intelligent or network-ready to the device network. Accordingly, SDNA provides support services to emulate the desired device functionality that permit transparent device integration. The result is a fully integrated, hybrid network comprising smart and dumb devices alike.

Figure 2D:
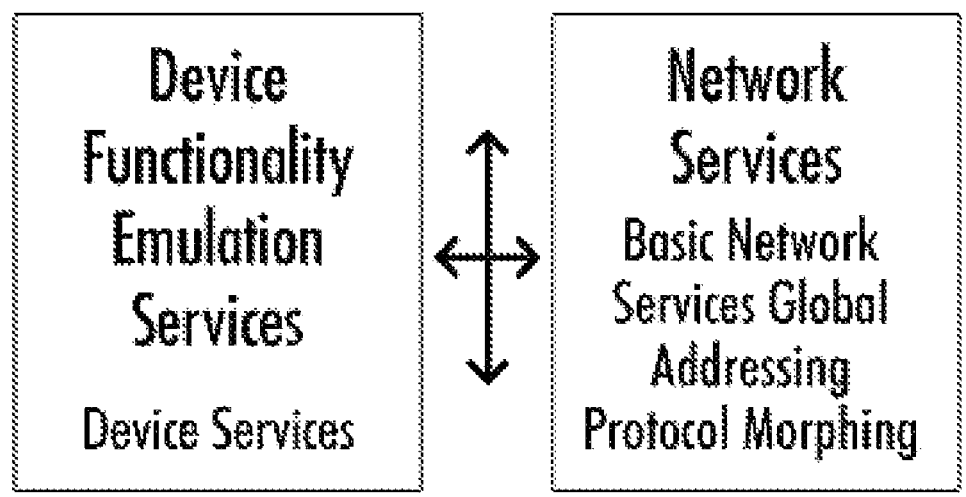
FIG. 2D illustrates details of the Database Services module.

SDNA Database Services: Shown on FIG. 2D, SDNA Database Services implement all functionality required for efficient data storage, access and manipulation of all other SDNA modules.

SDNA Database The SDNA Database, also known as SDNA Data Model, is a robust database back-end that stores all data related to SDNA operation (including configuration data, service- and user-related data, etc) and to applications executing over SDNA.

Query and Data Manipulation Services: Beyond the operation of the device network and resource management, SDNA Database Services also provide tools to execute direct data queries and modifications to the SDNA Database. This way, low-level data operations can be performed by an administrator with in-depth knowledge of the workings of the SDNA platform.

Abstraction Support: The Database Services allow the generation of abstract data objects derived from a logical combination of simpler data objects. These constitute the data structures and routines underlying SDNA entities.

Clustering, Redundancy and Backup Services: Clustering, Redundancy and Backup Services are designed to create an extra layer of data protection to guarantee data integrity and availability in case of database engine failure or other artifacts.

Operation of Invention

Figure 3:
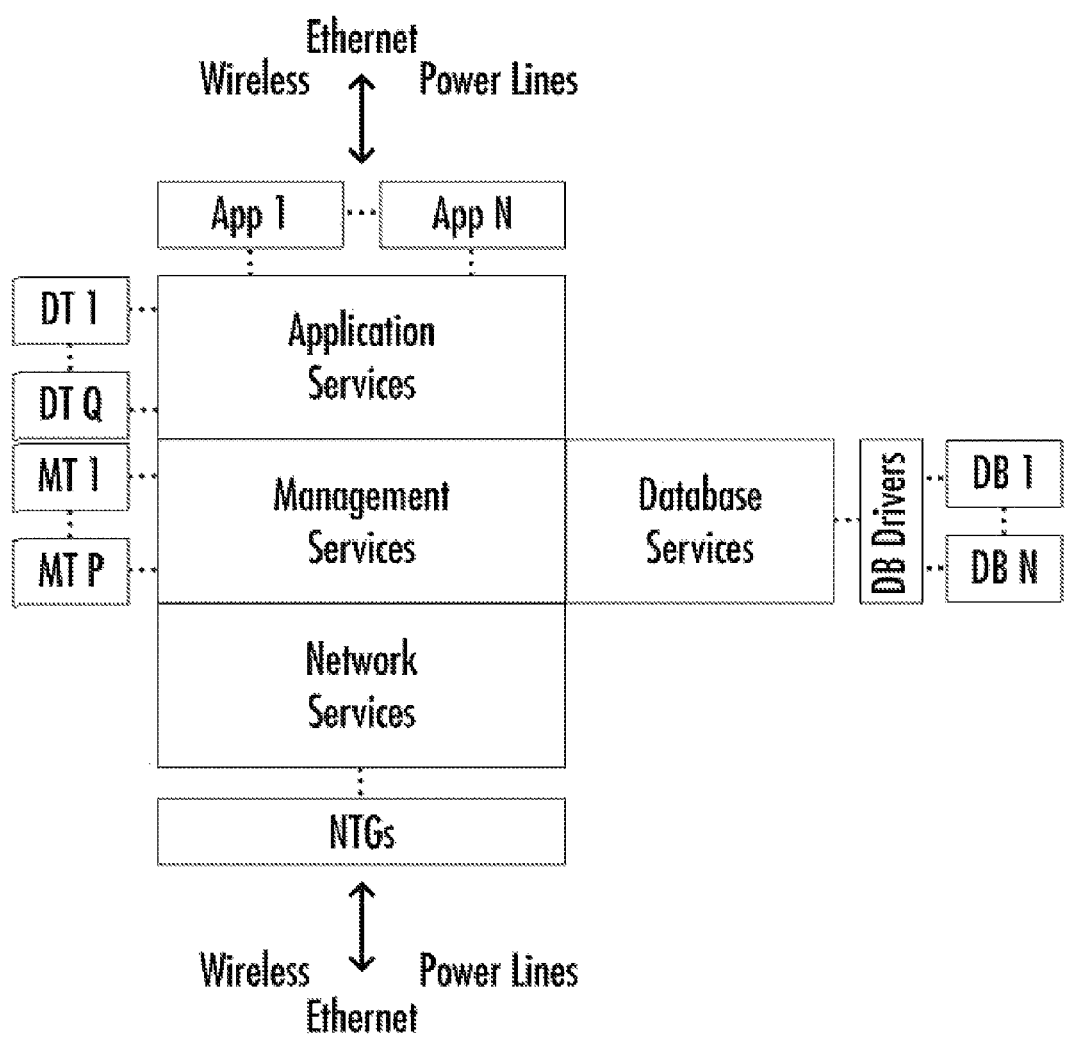
FIG. 3 shows the detailed view of the preferred embodiment of the architecture.

The operation of the method herein disclosed will now be described by referring to the accompanying drawings that illustrate preferred embodiment of the invention. FIG. 3 shows the detailed configuration of the preferred embodiment of the present method. Note that the infrastructure illustrated in FIG. 1 is completely embedded into the core of FIG. 3. Furthermore, FIG. 3 adds several blocks to the fundamental infrastructure. These will be described next.

Application Services: The basic functioning of SDNA Application Services has been described earlier. Beyond the details illustrated in FIG. 1, FIG. 3 shows two additional features, namely, blocks labeled App1 to AppN and DT1 to DTQ. Blocks App1 to AppN (i.e., App1, App2, App3 up to AppN, for arbitrary N) refer to all applications (1 through N) that are supported by the SDNA infrastructure. As stated above, Application Services are the entry points of applications into the SDNA. SDNA applications comprise a presentation interface that may be exposed over a variety of media, including Ethernet, Power Lines or Wireless interfaces. Blocks DT1 to DTQ (i.e., DT1, DT2, DT3 up to DTQ, for arbitrary Q) refer to all development tools (1 through Q) that have been integrated into SDNA. Application Development tools implement a complete Application Building Environment that provides all software libraries and tools required to develop complete distributed device network applications for the SDNA platform, such as Software Development Kits, Application Program Interfaces (APIs), and visual tools for software development.

Using these tools, developers and integrators may build applications to monitor, control, manage and automate any physical devices or logical combination of devices connected to the device network. Applications may be as simple as point-to-point device applications, and as complex as true distributed control solutions comprising an advanced distributed logic framework based on the paradigm of True Distributed Control.

SDKs and APIs offer an extensive set of software components, libraries, documentation and guidelines for rapid development of applications over the SDNA Infrastructure. They support full interaction with underlying SDNA Components, including event logging, data import and export services, data translation services, and many others.

The visual tools for software development are tools for the creation of graphical user interfaces and interface gateways, based on the latest presentation technologies. These interfaces constitute an SDNA application's presentation layer. Examples of presentation technologies are HTML/DHTML, JavaScript, ASP, JSP, WAP and XML.

Management Services: The basic functioning of SDNA Management Services has been described earlier. Beyond the details featured in FIG. 1, FIG. 3 illustrates one additional feature, namely, blocks MT1 to MTP.

Blocks MT1 to MTP (i.e., MT1, MT2, MT3 up to MTP, for arbitrary P) refer to all management tools (1 through P) that are supported by the SDNA infrastructure. Management tools include any operation managers, such as the SDNA Entity Manager, that interact with SDNA internal processes (i.e., SDNA Entity Management Services). SDNA Management tools enter the SDNA infrastructure through Coordination and Transactional Services.

Database Services: The basic functioning of SDNA Database Services has been described above. Beyond the details shown on FIG. 1, FIG. 3 illustrates two additional features, namely, DB Drivers and DB1 to DBM.

The Database Services module connects to Database Drivers (DB Drivers). Database Drivers translate SDNA's internal data handling routines and structures into database engine-specific language. This allows SDNA to simultaneously interface with several databases using different database engines. The Database Services enable SDNA to operate independently of the underlying database technology. Blocks DB1 to DBM (i.e., DB1, DB2, DB3, up to DBM, for arbitrary M) refer to all underlying database engines being used by the SDNA infrastructure.

Smart Network Services: The functioning of the SDNA Smart Network services has been described above. Beyond the details shown on FIG. 1, FIG. 3 illustrates an additional feature, namely, NTGs. NTG stands for Network Translation Gateway. SDNA supports the use of several NTGs. Smart Network Services connect to Network Translation Gateways, which translate SDNA's internal communication data structures into network protocol and medium-specific language for transmission. Smart Network Services effectively enable SDNA to operate independently of the underlying networking technology. Supported network protocols include TCP/IP, LonTalk, etc. Support network media include Ethernet, ATM, Wireless (e.g., CPDP, Radio Frequency) and Power Lines.

Figure 4:
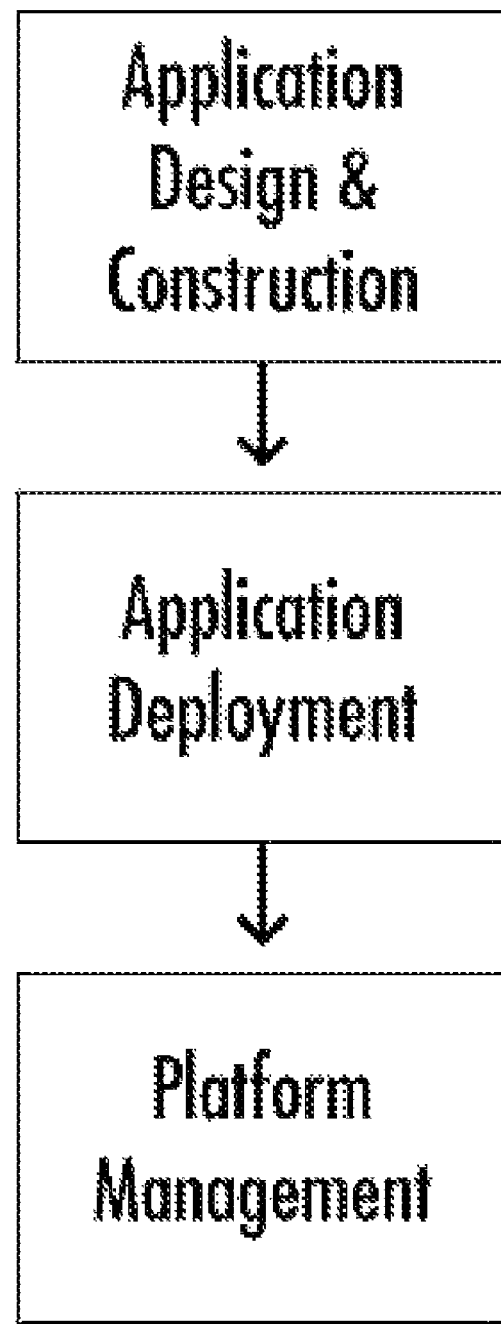
FIG. 4 shows the overall utilization of the architecture.

FIG. 4 illustrates an exemplary application lifecycle with SDNA. It includes three steps: Application Design and Construction, Application Deployment and Platform Management. First, using SDNA Application Services and development tools, an application is designed and constructed. This also applies to application upgrades, updates, etc.

Second, using SDNA Deployment Services, the new application is deployed onto the device network. This may involve downloading specific configuration or program information into all or some devices on the device network.

Finally, all applications are managed using SDNA Management Tools. Using SDNA Management Tools the entire platform over which applications exist can be managed. As all applications existing over SDNA follow the same guidelines, all can be managed using the same tools.

Conclusion, Ramifications and Scope of Invention

Thus, the reader will see that the presented method of integrated smart device network application infrastructure provides a comprehensive environment in which distributed device network applications, regardless of complexity, can be developed, deployed and managed. Said infrastructure is not bound to any specific proprietary technologies and can operate over any existing network technology and use any existing technology for smart devices and smart device networks.

While our above description contains many details, these should not be construed as limitations to the scope of the invention, but rather as an exemplification of one preferred embodiment thereof. Obviously, modifications and alterations will occur to others upon a reading and understanding of this specification.

For example, other specialized service processes can be added onto every fundamental processing module shown in FIG. 1. These specialized services can derive from existing services or can be new altogether.

In addition, some special SDNA uses are evident. This is the case for companies providing network services (i.e., network service providers). SDNA can be easily used as the main infrastructure on which all services (e.g., automation-related services and applications) can be developed, deployed and offered to all customers or other users.

The description above is intended, however, to include all such modifications and alterations insofar as they come within the scope of the appended claims or the equivalents thereof.

We claim:

1. A method designed to implement a networking platform, also called a Network Application Infrastructure, with the goal of supporting and facilitating the development, deployment and management of device network applications that rely on it as middleware, comprising:

running a network platform on a computer network, where said network platform has an Application Services module, a Management Services module, a Database Services module, and a Smart Network Services module; where said Application Services module is comprised of Deployment Services providing tools for installation, uninstallation, configuration, and status monitoring of applications within the network platform;

Gateway Interface Services which translate an applications' generic interface to appear to devices as having specific interface to each line of said devices; where the Management Services runs device management tasks, and is comprised of Coordination and transactional services which ensure all actions performed on data within the network platform are whole transactions, and insure the proper completion, and reversal, of said transactions; the Entity Management Services which manages the devices belonging to the platform infrastructure; the Application Management Services which handles the activation, deactivation, upgrades of applications, hosting of multiple application versions, and the access to system resources; the Logging Management Services which registers all events and transactions occurring in any layer; Integration Services, which handles the inter-process communication channels among applications; where the Smart Network Services controls network services associated to controllers, drivers, and devices, and is comprised of Basic Network Services which process communication to enable the platform to communicate with all supported devices; Global Addressing which controls routing device-to-device communications across networks; Protocol Morphing which provides protocol transparency to enable addressing and data transfers to and from devices with different communications protocols; and Device Functionality Emulation Services, which emulates the desired device functionality to devices having limited processing capabilities; and where the Database Services module controls data storage, access and manipulation, storing all data and the administrative and structural configuration of the platform and executes all data queries and modifications to databases by means of an abstract object-relational layer and meta-data definitions about the objects being stored.

2. A method designed to implement a networking platform, also called a Network Application Infrastructure for when a final user wants to perform an action on a device or multiple devices with the goal of supporting and facilitating the development, deployment and management of device network applications that rely on it as middleware, comprising: having the user access a Smart Device Network Application (SDNA) application on a platform where each SNDA application is tied to a specific vertical market, where once the user has specified the action at a high level the SDNA application services creates an encapsulated and high level command sent to a SDNA Management services, where the Management Services take the high level command, splits it and serializes it in a single multi-component transaction, where transaction is built and monitored by the Coordination and Transactional Services where data related to the devices involved in the high level command is loaded in memory using an Entity Management Services which uses a Resource Control repository that makes object-high level data requests into common relational request, once the data is loaded into the platform cache, the Coordination and Transactional Services proceeds to split the high level commands into device specific low level commands in the proper order, having every action performed by every SDNA platform component logged in a database by a Log Management services, where depending on the licensing model that applies to the SDNA application, every high level action performed in a SDNA Application and low level actions determined by the Coordination and transactional services, are communicated to a billing and Customer Care Services which provides the charge per action to the user, after having said transaction built in a device specific basis, said transaction is sent to a Network services where said Network Services executes every command enclosed in the transaction, and writing for an answer, where capabilities that are emulated at a high level are handled by a Device Functionality Emulation services with the results produced by the Emulation Services and where incoming messages being received by the Network services from the devices involved in the command are put together and sent back to the Coordination and Transactional Services which is monitoring the consistency and complete execution of the transaction, if the transaction was executed successfully, then the Management Services proceeds to free the used resources and provide an answer to the Application Services and then to the SDNA application itself, and where in the case that the transaction can not be executed, the Management services frees the locked resources and provides a negative answer to the user through the Application Services.

* * * * *